E. ROSENBERG.
SYNCHRONOUS DYNAMO ELECTRIC MACHINE AND METHOD OF STARTING THEREFOR.
APPLICATION FILED APR. 25, 1914.
1,231,652.
Patented July 3, 1917.
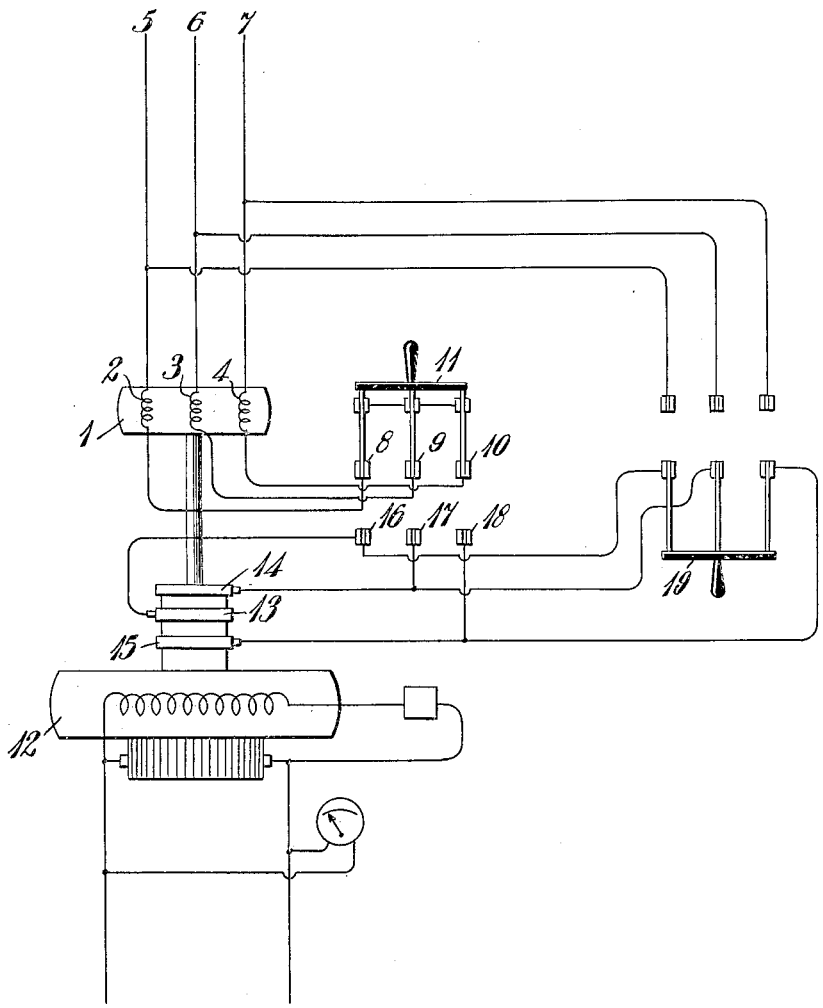
WITNESSES:
INVENTOR
Emanuel Rosenberg
BY
ATTORNEY

UNITED STATES PATENT OFFICE.

EMANUEL ROSENBERG, OF ASHBOURNE, BOWDON, ENGLAND, ASSIGNOR TO WESTINGHOUSE ELECTRIC AND MANUFACTURING COMPANY, A CORPORATION OF PENNSYLVANIA.

SYNCHRONOUS DYNAMO-ELECTRIC MACHINE AND METHOD OF STARTING THEREFOR.

1,231,652.  Specification of Letters Patent.  Patented July 3, 1917.

Application filed April 25, 1914. Serial No. 834,363.

*To all whom it may concern:*

Be it known that I, EMANUEL ROSENBERG, a subject of the Emperor of Austria, and a resident of Ashbourne, Belgrave Road, Bowdon, in the county of Chester, England, have invented a new and useful Improvement in Synchronous Dynamo-Electric Machines and Methods of Starting Therefor, of which the following is a specification.

My invention relates to the starting of synchronous dynamo-electric machines and is a modification of the invention described in my application Serial No. 761,415, filed April 16, 1913.

The said application sets forth a method of starting a synchronous dynamo-electric machine by means of an electric motor, in which a series connection, or its electrical equivalent, is provided between the primary winding of the starting motor and the synchronous machine for the purpose of effecting self-synchronizing of the latter.

According to my present invention, the starting motor is electrically disconnected from the synchronous machine until the machine has attained the desired speed, and then the motor and the machine are connected in series circuit relation. The advantage of this method is that the residual magnetism of the synchronous machine is not affected by the first rush of current, even if the starting motor takes a large current, because, at the start and while the machine is running at a low speed, there is no electrical connection between the motor and the machine. The field of the synchronous machine is also enabled to build up in the right direction, and, when the starting motor is afterward connected in series with the synchronous machine in order to obtain synchronization, the polarity of the synchronous machine will not be affected.

The general arrangements for starting synchronous machines in accordance with my present invention may, like those described in my application hereinbefore mentioned, include a synchronous machine, such as a three-phase rotary converter, and a three-phase induction motor mounted on the same shaft, together with conductors for connecting the primary windings of the motor to the slip-rings of the converter, and other conductors for shunting current from the supply mains around the motor and conducting such current directly to the converter. A change-over switch or other suitable device is employed for the purpose of inter-connecting the terminals of the starting motor winding at the time of starting, when the motor and the machine are electrically disconnected, and for afterward connecting the motor winding in series relation with the winding of the synchronous machine.

The single figure of the accompanying drawing is a diagrammatic view showing, by way of example, arrangements for starting a three-phase rotary converter in accordance with the present invention.

A starting motor 1 has its primary windings 2, 3, and 4 connected, respectively, to supply mains 5, 6 and 7, and to terminals 8, 9 and 10 of a double-throw, three-pole switch 11. A rotary converter 12 has its slip rings 13, 14 and 15 connected, respectively to terminals 16, 17 and 18 of the switch 11, and is also arranged to be connected directly to the supply mains through a main switch 19.

In order to start the converter, the switch 11 is thrown to the position shown in the drawing, in which position the terminals 8, 9 and 10 are connected together, the switch 19 being open, and current is supplied to the starting motor. After the converter has attained the desired speed, the switch 11 is thrown to its other position, in which the terminals 8, 9 and 10 are connected to the terminals 16, 17 and 18, respectively, thus connecting the primary windings of the starting motor in series-circuit relation with the winding of the converter, and thereby effecting synchronization of the latter. As soon as the converter is in synchronism, the switch 19 is closed to connect the converter directly to the supply mains.

I claim as my invention:

1. The method of starting a synchronous dynamo-electric machine by the aid of an induction motor mechanically coupled thereto which comprises first connecting solely the primary winding of said motor to a source of alternating current, bringing said machine up to substantially synchronous speed, and then connecting the armature winding of said machine to said source with the primary winding of said motor inserted in said connection.

2. The method of starting a synchronous dynamo-electric machine by the aid of an induction motor mechanically coupled thereto which comprises first connecting solely the primary winding of said motor to a source of alternating current, bringing said machine up to substantially synchronous speed, connecting the armature winding of said machine to said source with the primary winding of said motor inserted in said connection, and finally eliminating the primary winding of said induction motor from the load current circuit.

3. The method of starting a synchronous dynamo-electric machine by the aid of an induction motor mechanically coupled thereto which comprises first employing said motor alone to bring said machine up to substantially synchronous speed, and then employing the primary winding of said motor as a current limiting device in reducing the current supplied to said machine.

4. The method of starting a synchronous dynamo-electric machine by the aid of an induction motor mechanically coupled thereto which comprises first employing said motor alone to bring said machine up to substantially synchronous speed, employing the primary winding of said motor as a current limiting device in reducing the current supplied to said machine, and finally eliminating the primary winding of said motor from the supply circuit of said machine.

5. The combination with a polyphase synchronous dynamo-electric machine, and an induction motor of the same number of phases and mounted on the same shaft, of means for supplying current to the said motor, means independent of the said motor for supplying current to the said machine, and means, including a double-throw switch, for connecting the windings of the motor and the windings of the machine together, the said switch being adapted, in one position, to interconnect the primary windings of the motor, and, in another position, to connect the primary windings of the motor to those of the machine in series relation.

In testimony whereof, I have hereunto subscribed my name this first day of April, 1914.

EMANUEL ROSENBERG.

Witnesses:
   Jas. Stewart Proudfoot,
   N. W. Bowman.